Sept. 25, 1956 S. F. ARMINGTON 2,764,205
TIRE TRACK SHOE-CHEVRON GROUSER
Filed Dec. 8, 1952 2 Sheets-Sheet 1
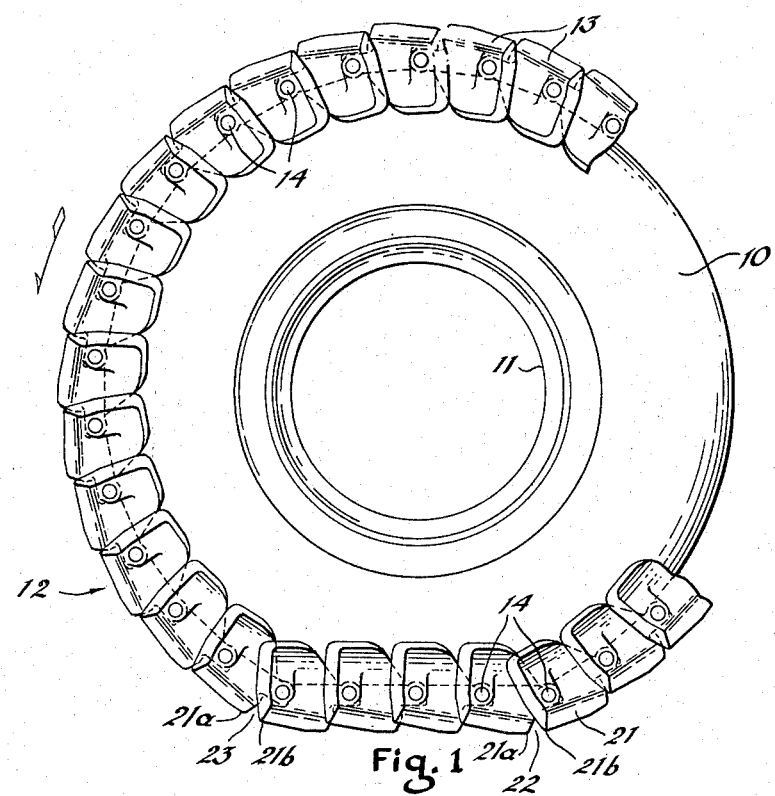
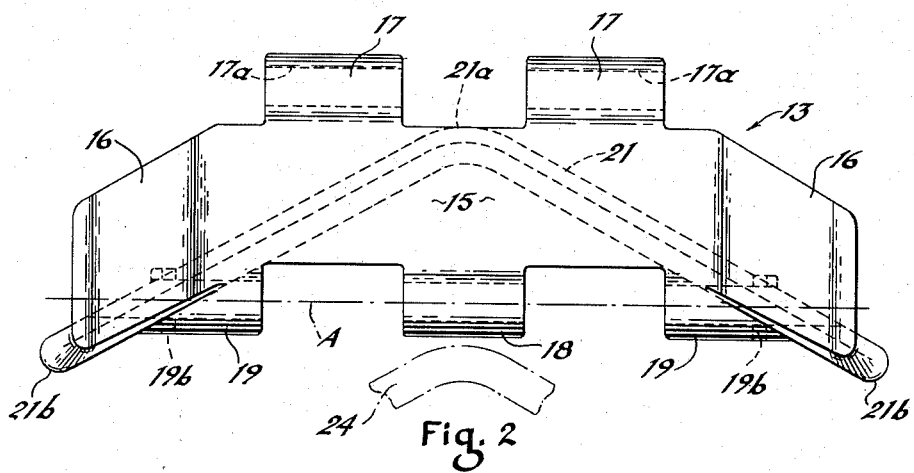
INVENTOR.
Stewart F. Armington
BY
Hyde, Meyer, Baldwin & Doran
ATTORNEYS Sept. 25, 1956 S. F. ARMINGTON 2,764,205
TIRE TRACK SHOE-CHEVRON GROUSER
Filed Dec. 8, 1952 2 Sheets-Sheet 2
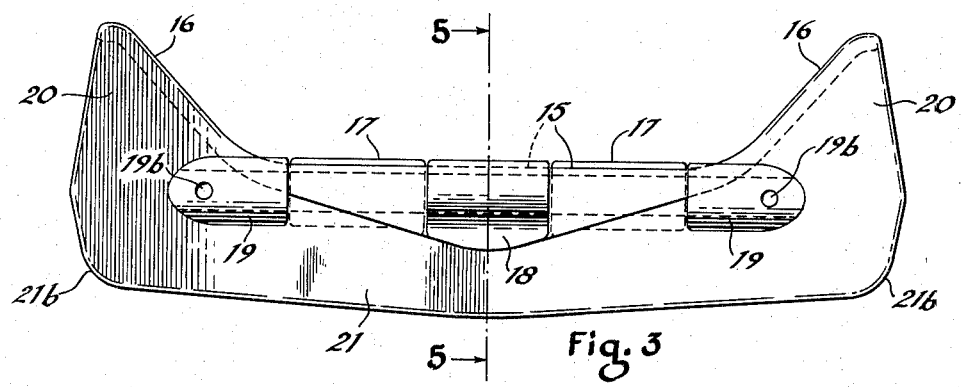
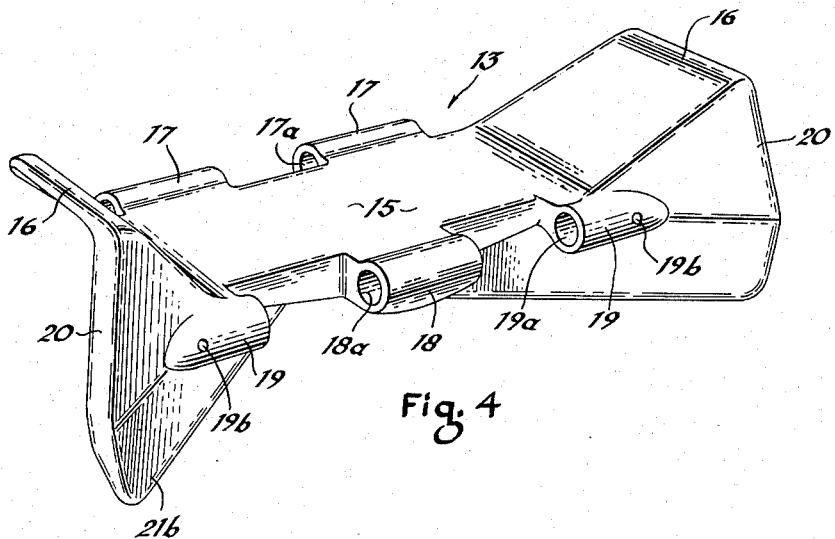
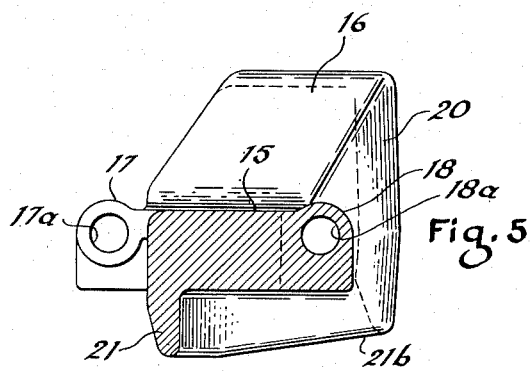
INVENTOR.
Stewart F. Armington
BY
Hyde, Meyer, Baldwin & Doran
ATTORNEYS

United States Patent Office 2,764,205
Patented Sept. 25, 1956

2,764,205

TIRE TRACK SHOE-CHEVRON GROUSER

Stewart F. Armington, Willoughby, Ohio, assignor, by mesne assignments, to General Motors Corporation, Detroit, Mich., a corporation of Delaware Application December 8, 1952, Serial No. 324,673

5 Claims. (Cl. 152—182)

This invention relates to improvements in a combination of a large pneumatic tire and an endless track completely surrounding and partially embracing the tire, and to improvements in the track itself and the individual shoes of which it is composed.

One of the objects of the present invention is to provide a novel combination between a large size pneumatic tire and an endless track completely surrounding and partially embracing the tire, the track protecting the tire against abrasion and being so formed that it increases the grip between the tire and the ground when driving large vehicles off-the-highway.

Another object of the present invention is the provision of a novel track for use with pneumatic tires, wherein the track is formed of a plurality of shoes, each shoe having a chevron-shaped or V-shaped grouser on the ground-engaging side of each shoe.

Another object of the present invention is to provide an endless track of the type described composed of a plurality of rigid shoes with hinge connections between adjacent shoes, each of the shoes having a V-shaped grouser on its ground-engaging side with the apex of the V-shape located near the center of one side of the shoe and the legs of the grouser diverging from this apex and terminating near the ends of the other side of the shoe and in line with the hinge connection so that the track cleans itself of mud and the like very efficiently.

Other objects and advantages of the present invention will be apparent from the accompanying drawings and description, and the essential features thereof will be set forth in the appended claims.

In the drawings,

Fig. 1 is a side elevational view showing a pneumatic tire with my improved endless track in position on the tire, and with the entire combination under load;

Fig. 2 is a top plan view enlarged of one of the shoes comprising the track shown in Fig. 1;

Fig. 3 is an end elevational view taken at the lower side of Fig. 2;

Fig. 4 is a perspective view of the shoe of Figs. 2 and 3; while

Fig. 5 is a transverse sectional view taken along the line 5—5 of Fig. 3.

Off-the-highway vehicles use large pneumatic tire both for the purpose of carrying the load and for the purpose of floating the load on a large supporting area which is especially necessary where ground conditions are poor for supporting heavy loads such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire so as to give a protective effect to the pneumatic tire, and at the same time to increase the tractive effect when such tires are driven, in order to propel the vehicle more efficiently.

The tire illustrated herein is 18.00 x 25 tire which means that its overall diameter is approximately five feet. My invention is intended for successful operation with tires of this size or larger, utilizing an internal pressure of not substantially over 25 pounds per square inch.

The tire 10 illustrated herein is of this character. It is shown mounted upon a wheel drum 11 in the usual manner. The endless track 12 is composed of a plurality of identical shoes 13 connected together by hinge pins 14. The track 12 is assembled upon the tire 10 with the tire in deflated condition. Even then, effort must be exerted to assemble the track snugly upon the tire so as to compress the tread portion of the tire radially inwardly and to cause the side walls of the tire to be bulged or deflected laterally outwardly by the endless belt of track shoes when assembled on the tire under no load conditions. It is important that an endless track of this type be firmly engaged with the tire at all times, so that the tires does not slip within the track and so wear away the rubber. This condition is met when an endless track composed of the shoes 13 herein described is assembled upon the tire 10 in a deflated or semi-inflated condition, after which the tire is fully inflated and the track is frictionally held upon the tire under all conditions.

The track 12 is composed of a plurality of rigid shoes, preferably of steel or iron, and having articulating or hinge connections between adjacent shoes. One of these shoes is clearly shown in Figs. 2, 3, 4 and 5. It will be noted that each shoe 13 is longer crosswise of the tire than its extent circumferentially of the tire. Each shoe has a flat tread-engaging inner surface 15 which is substantially flat for the full width of the tread of the tire. At each end, this inner surface, on the side toward the tire, diverges outwardly and radially inwardly (when the shoe is assembled upon the tire), these wing portions being designated 16. It will be clear from an examination of Figs. 3, 4 and 5 that the central portion 15 of each shoe is of considerable thickness as seen in Fig. 5, while the wing portions 16 are of thinner material so as to save weight. On one of the longer sides of the shoe two hinge lugs 17 extend outwardly from the central portion 15. These lugs have openings 17a to receive hinge pins. From the other longer side of the shoe there extends from the central portion 15 a central hinge lug 18 and, spaced on either side of this lug are two lugs 19 which extend partly from the central portion 15 and partly from a wall 20 which extends substantially radially of the tire from the wing portion 16. These lugs 18 and 19 have through openings 18a and 19a respectively for receiving a hinge pin. It will be noted that the spacing of the lugs 17, 18 and 19 is such that the lugs 17 of one shoe fit snugly between the lugs 18 and 19 of the adjacent shoe. The hinge pin 14 is then extended through all of these aligned lugs 17, 18 and 19. This hinge pin is retained by suitable securing means in the openings 19b. It will be noted in Figs. 3 and 5 that the tops of the hinge lugs are almost on the level of the surface 15 and just slightly above that level.

A novel feature of the present track is that each shoe has on the ground-engaging side thereof, a V-shaped grouser 21. Referring to Figs. 2 and 5, it will be noted that the apex 21a of the grouser is at the center of one of the longer sides of the shoe while the legs 21b diverge outwardly away from the point. Referring to Fig. 2, it will be noted that the outer ends of the legs 21b terminate very closely to the hinge axis A. It will be noted also that these legs 21b at their outer ends are substantially extensions of the wall 20 extending downwardly from the wings 16. Figs. 3 and 5 indicate that the grouser 21 extends somewhat deeper into the ground at its apex than at the outer ends of its legs.

The track is assembled upon the tire 10 so that all of the V-shaped grousers 21 point in the same direction, namely, in the direction of wheel rotation in the normal forward operation of the vehicle.

It has been found that a track constructed as herein described, cleans itself of dirt very well. The V-shaped grouser acts somewhat like a snow plow as the V-shape forces its way into the dirt. The apparent openings 22 and 23 in Fig. 1 are the result of the hinging action of the shoes ahead of and behind the flattened ground contact area. This apparent opening is not the full earth clearance distance between the grousers, but it does indicate a widening of this distance. This widening resulting from the hinging action of the shoes does tend to loosen any earth that might be sticking in between the grousers. I have thus provided a good self-cleaning track and one which gives a very good bite into the ground in order to improve the driving effect when the tire is driven by the usual motor equipment of the vehicle.

Referring to Fig. 2, I have shown at 24 the relative position of the apex 21a of the next adjacent shoe when the shoes are assembled in an endless track. It will be seen that the weight of the vehicle is carried substantially simultaneously on the outer ends of the legs 21b of the shoe which is completely shown and at the same time some of the weight is also carried at the portion of the grouser apex indicated at 24 as belonging to the adjacent shoe. This arrangement provides a rather continuous surface of contact with the ground. This construction permits faster travel speeds and reduces the bumping effect which is noted if the grousers extend directly crosswise of the tire rather than in V-shape. This advantageous result is particularly noticeable on hard ground.

What I claim is:

1. A track shoe wider across the track than its length along the track, said shoe having a tread portion and a V-shaped grouser beneath and integral with said tread portion, said shoe having parallel hinge connections along its longer sides, said grouser having its apex near the center of one of the longer sides of said shoe, and said grouser having legs diverging from said apex diagonally across the lower surface of said shoe and terminating near the ends of the other of the longer sides of said shoe.

2. The combination of claim 1 wherein said grouser legs terminate at their outer ends substantially in line with one of said hinge connections.

3. A track shoe having a tread portion and a V-shaped grouser beneath and integral with said tread portion, said shoe having parallel hinge connections along its longer sides, said grouser having its apex near the center of one of the longer sides of said shoe, and said grouser having legs diverging from said apex across the lower surface of said shoe and terminating near the ends of the other of the longer sides of said shoe.

4. In combination, a pneumatic tire, an endless track completely surrounding and engaging the circumference of said tire, said tire having a greater peripheral diameter when inflated to working pressure and unconfined than the effective tire-engaging diameter of said track so that said track is held frictionally on said tire, said track comprising a plurality of shoes and articulating connections between adjacent shoes, said shoes being wider crosswise of the tire than lengthwise around the periphery of the tire, each of said shoes having on its ground-engaging face a single V-shaped grouser rigid with the associated shoe, each of said grousers having an apex near the center line of the tire tread and legs diverging therefrom, said apex of one grouser lying adjacent the articulating connection of the associated shoe with the adjacent shoe on one side, and the ends of the legs of said one grouser lying adjacent the articulating connection of the associated shoe with the adjacent shoe on the other side.

5. In combination, a pneumatic tire, an endless track completely surrounding and engaging the circumference of said tire, said tire having a greater peripheral diameter when inflated to working pressure and unconfined than the effective tire-engaging diameter of said track so that said track is held frictionally on said tire, said track comprising a plurality of shoes and articulating connections between adjacent shoes, said shoes being wider crosswise of the tire than lengthwise around the periphery of the tire, each of said shoes having on its ground-engaging face a single V-shaped grouser rigid with the associated shoe, each of said grousers having an apex near the center line of the tire tread and legs diverging therefrom, said apex of one grouser lying adjacent the articulating connection of the associated shoe with the adjacent shoe on one side, the ends of the legs of said grouser lying adjacent the articulating connection of the associated shoe with the adjacent shoe on the other side, the apex of each grouser lying near the center of one of the longer sides of its associated shoe, the ends of the legs of each grouser lying near the ends of the other of the longer sides of the associated shoe and the apex of each of said grousers being disposed in the same direction.

References Cited in the file of this patent

UNITED STATES PATENTS

| | | |
|---|---|---|
| 1,139,388 | Weed | May 11, 1915 |
| 1,307,036 | Bretscher | June 17, 1919 |
| 1,425,356 | Auden | Aug. 8, 1922 |
| 2,046,299 | Armington | June 30, 1936 |

FOREIGN PATENTS

| | | |
|---|---|---|
| 514,188 | France | Mar. 4, 1921 |